No. 840,420. PATENTED JAN. 1, 1907.
J. L. BANGLEY.
PROTECTOR FOR PEANUT SHOCKS.
APPLICATION FILED JAN. 17, 1906.
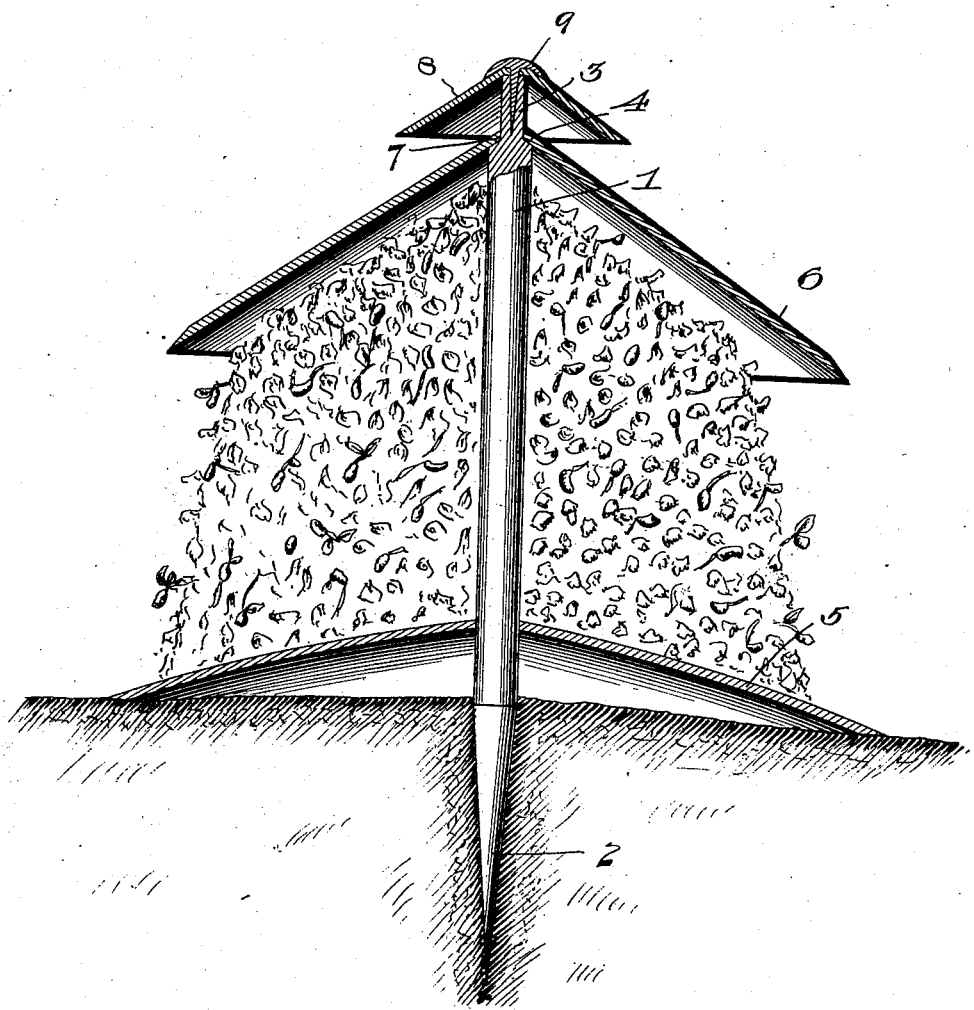
Witnesses
P. L. Moore
James F. Crown
Inventor
Joseph L. Bangley
By James L. Skidmore
his Attorney

UNITED STATES PATENT OFFICE.

JOSEPH L. BANGLEY, OF SUFFOLK, VIRGINIA, ASSIGNOR OF ONE-THIRD TO MILBY W. LLOYD, OF SUFFOLK, VIRGINIA.

PROTECTOR FOR PEANUT-SHOCKS.

No. 840,420.  Specification of Letters Patent.  Patented Jan. 1, 1907.

Application filed January 17, 1906. Serial No. 296,564.

*To all whom it may concern:*

Be it known that I, JOSEPH L. BANGLEY, a citizen of the United States, residing at Suffolk, in the county of Nansemond and State of Virginia, have invented new and useful Improvements in Protectors for Peanut-Shocks, of which the following is a specification.

This invention relates to shock-protectors, designed more particularly for use in protecting peanut crops after the nuts have been withdrawn from the ground and placed in shocks.

In the culture of peanuts it has been the customary practice to gather the nuts by taking hold of the vines and drawing the nuts from the ground without detaching them from the vines. After the nuts have been drawn out of the ground, still clinging to the vines, they are stacked up in piles or shocks and are left in this condition until they have been properly aired, dried, and cured. Should there be a rainfall while the nuts are in the shock the shells of the nuts become spotted, rusted, or discolored, and thus their value very materially reduced. The portions of the shock lying next to the ground are very liable to become discolored, and the moisture is liable to be absorbed even at the upper portion of the shock during a rain, and this also affects the value of the crop.

The principal object of my invention is to provide simple, inexpensive, and efficient means for preventing the discoloration of the peanut-shells even in case of rain during the time they are exposed to the action of the air in curing.

Another object is to provide a shock-protector in which the materials used and the general construction are such that unskilled labor may be employed in making and erecting the same.

These and other objects are attained by means of the construction illustrated in the accompanying drawing, which illustrates in vertical section a shock-protector made in accordance with my invention and showing the vines and nuts lying under the protector.

In carrying my invention into effect I make use of a center post or stake 1, which may be conveniently made of wood and provided with a pointed end 2 to facilitate the driving of the post in the ground. This post may be of any required height and is provided with a reduced portion 3 near its upper end and a shoulder or offset 4 below said reduced portion. The upper end of the post may be flat to facilitate the driving operation. Surrounding the post near the ground is a curved or dome-shaped shield 5, said shield being formed of any suitable material of a waterproof character, such as roofing-paper or suitably-treated stock, which may be oiled or painted to prevent the moisture from the ground from coming in contact with the vines or nuts placed upon said shield. A central opening may be formed in this shield to permit the post to pass through it, and the shield being concave-convex is thus raised from the ground in the center to permit a free circulation of air underneath it and to prevent the rain from running under it.

Near the upper end of the post is a cover or protector 6, made of flaring or frusto-conical shape and composed of waterproof material, like tarred paper or oiled or painted paper-stock. A hole 7 is formed centrally in this cover, said hole being of a size to engage the shoulder or offset 4, and thus support the cover in position to shed the rain from the peanuts and vines below it.

To prevent the rain from beating in and running down the post 1 through the hole 7 in the cover 6, an imperforate cap 8, of suitable waterproof material like the cover 6, is placed on the upper end of the post and secured in place by a cap-headed nail or tack 9.

In practice the nuts clinging to the vines are piled up around the post 1 upon the shield 5 and under the protector 6, and thus kept dry, while the air is permitted to circulate freely through the mass of vines and nuts.

By means of this contrivance I have been enabled to secure a good clean crop of peanuts, which will not require the usual scouring and cleaning process to render them saleable.

Various changes in detail construction may be made without departing from the spirit or scope of my invention as defined by the following claims.

Having thus described my invention, what I desire to secure by Letters Patent and claim is—

1. In a protector of the character described, a post, a dome-shaped shield of waterproof material surrounding said post and resting upon the ground, a waterproof cover or protector supported near the top of the post, and an imperforate cap secured at the top of the post, substantially as described.

2. A protector of the character described, comprising a post, adapted to be driven in the ground, and provided with a reduced upper end and a shoulder or offset below said reduced portion, a concavo-convex waterproof shield surrounding said post and adapted to rest upon the ground, a cover of waterproof material provided with a central opening and adapted to rest upon the shoulder or offset, and a cap of waterproof material secured to the top of the post by a cap-headed nail, substantially as described.

JOSEPH L. BANGLEY.

In presence of—
G. W. PAINE,
J. P. LEE.